United States Patent [19]

Dudek

[11] 4,389,908
[45] Jun. 28, 1983

[54] PARTIALLY FLUID LOCKED DRIVE TRAIN

[75] Inventor: Harold M. Dudek, Bellevue, Wash.

[73] Assignee: Astro Development Corporation, Seattle, Wash.

[21] Appl. No.: 106,716

[22] Filed: Dec. 26, 1979

[51] Int. Cl.³ .............................................. F16H 1/44
[52] U.S. Cl. .................................... 74/711; 74/710.5
[58] Field of Search ...................... 74/710.5, 711, 714

[56] References Cited

U.S. PATENT DOCUMENTS

| | | | |
|---|---|---|---|
| 1,229,548 | 6/1917 | Van Sant | 74/711 |
| 1,454,578 | 5/1923 | Towler | 74/711 |
| 2,178,613 | 11/1939 | Seeck | 74/714 X |
| 2,269,734 | 1/1942 | Powell | 74/714 |
| 2,574,986 | 11/1951 | Schou | 180/233 X |
| 3,060,765 | 10/1962 | Rinsoz | 74/710.5 |
| 3,251,244 | 5/1966 | Nickell | 74/711 |
| 3,292,456 | 12/1966 | Saari | 74/711 |
| 3,375,735 | 4/1968 | Saari | 74/711 |
| 3,375,736 | 4/1968 | Saari | 74/711 |
| 3,406,593 | 10/1968 | Vesey | 74/711 |
| 3,494,226 | 2/1970 | Biddle | 74/711 |
| 3,738,192 | 6/1973 | Beignsky | 74/714 |
| 3,792,628 | 2/1974 | Stieg | 74/711 |
| 3,869,940 | 3/1975 | Webb | 74/711 |
| 4,084,654 | 4/1978 | Dudek | 74/711 X |
| 4,272,993 | 6/1981 | Kopich | 74/714 |

FOREIGN PATENT DOCUMENTS 595870 4/1960 Canada ............................... 74/711
1223435 2/1971 United Kingdom ................ 74/711

OTHER PUBLICATIONS

Detroit Automotive Division of Aspro, Inc. Warren, Mich.

Primary Examiner—Leslie A. Braun
Assistant Examiner—Lawrence J. Gotts
Attorney, Agent, or Firm—Seed, Berry, Vernon & Baynham

[57] ABSTRACT

Partial locking for a fluid-locked planetary gear used in a differential or the like is obtained by causing oil to be squeezed between the gears of a planetary gear train, thereby providing increased resistance to movement, or partial locking, of the gears within the gear train. Improved partial locking for a fluid-locked planetary gear train is provided by loosely mounting planet gears for movement within the chambers which closely surround the partially locked planet gears. The driving and reaction forces on the loosely mounted planet gears permit the planet gears to move so that their peripheral ends come into close engagement with the walls of the chambers in which the gears are mounted to further increase the fluid resistance to movement of the gears. To obtain similar partial locking characteristics in either a forward or a reverse direction, the planet gear pairs and their corresponding chambers are reversed in their relative positions.

5 Claims, 4 Drawing Figures

PARTIALLY FLUID LOCKED DRIVE TRAIN

BACKGROUND OF THE INVENTION

1. Field of the Invention

This invention relates to an improved fluid lock drive train for use with partially locking automotive differentials and the like.

2. Description of the Prior Art

A conventional bevel gear differential delivers equal output torque to both of its output shafts. Equal division of output torque permits each wheel connected to the output shaft to rotate at different speeds when required, for example, when the vehicle is turning a corner. This characteristic of delivering equal torque to each wheel of a vehicle is undesirable when one wheel has greater traction than the other, for example, when one wheel rests on dry pavement and the other wheel rests on a slippery surface. Both wheels have equal driving power applied thereto. That power is limited to whatever power is delivered to the wheel on the slippery surface. As a result, the wheel on the dry pavement receives very little power and the vehicle becomes stuck. Of course, both output shafts could be locked together so that the differential is, in effect, a locked differential. Obviously, this would eliminate the desirable aspects of the differential and make turning and handling very difficult on surfaces having good traction characteristics since both wheels would have to rotate as the same speed at all times.

To enable vehicles to operate on slipery surfaces, various types of so called partially locking or limited slip differential systems have been developed. A partially locked differential system permits drive power to be transferred to the wheel having good traction while still permitting normal differential action, which permits one wheel to rotate faster than another while the vehicle is making a turn.

An oil-operated system is disclosed in U.S. Pat. No. 4,084,654 entitled "PARTIALLY FLUID LOCKED VEHICLE DRIVE TRAIN", granted to Harold M. Dudek on April 18, 1978. That system uses oil both for partially locking a differential gear train and for cooling the differential gear train. A planetary gear drive for that system has all the component gears lying in a common plane and enclosed on opposite sides by closely abutting side plates which form chambers for the gears. The side plates are provided with oil passages which allow oil to enter into the gear teeth at points upstream from the meshing points of the gear teeth. The oil is carried by the gear teeth and squeezed between the intermeshing a close-toleranced gear teeth to provide fluid resistance to movement of the gears. The fluid resistance provides a partial fluid locking of the planetary drive train. The side plates are formed to fit closely against the gear ends and to form chambers which closely surround the peripheries of the gears. The planet gears used for the drive train are mounted on rigididly supported bearings so that the spacing of the planet gears with respect to the walls of the chambers are fixed.

As an example of a frictional prior art limited slip differential, the Detroit Automotive Division of Aspro, Inc., Warren, Michigan provides a gear-type mechanism which uses a pair of intermeshing roller type helical pinion gears. Each output axle is connected to one of a pair of coaxially aligned sun gears. Each pinion gear engages one of the sun gears to provide differential action. The geometry of the gears causes the pinion gears to move against the walls of their supporting pockets to develop rubbing friction between the gears and the pockets.

SUMMARY OF THE INVENTION

It is an object of the invention to provide a relatively inexpensive and simple partially locking gear train for use with an automotive axle differential or transfer case differential or the like.

It is another object of the invention to provide an improved fluid-assisted partially locking vehicle drive train.

It is another object of the invention to provide a fluid operated, partially locked vehicle drive train which has uniform torque transfer characteristics in both a forward and reverse direction.

These and other objects of the invention are achieved by an improved partially fluid-locked gear train for a transfer case or differential or the like. The invention provides enhanced performance and improved fluid-partial locking for the gear train of a planetary-type differential system. The planetary gear train has an outer fluid-tight housing which surrounds an inner housing. Means are provided for delivering fluid into the inner housing and maintaining said inner housing in a generally filled condition. The inner housing contains the planetary gear train which includes a sun gear, a plurality of planet gears, and an internal ring gear with all of said gears lying in a common plane. Plate means are provided on opposite sides of the gears in close abutting relation and portions of the plate means also surround the peripheries of the gears providing chambers for containing the planet gears. The plate means includes coaxially aligned fluid inlet and outlet ports which are located in alignment with the teeth of the gears but spaced a distance from the point of mesh of the gears. Fluid is carried by a gear from the inlet to the mesh point where squeezing of the fluid creates forces resisting movement of the gears.

The improved partially locked gear train according to the inventors provides means for movably positioning the ends of the planet gear teeth into close abutting relation with the walls of the chambers in which they are located. Movement of the gear teeth toward the chamber walls reduces the gap between the gear teeth and walls, thus reducing fluid leakage past the gear teeth and consequently the fluid pressure increases, which increases the resistance forces on the gear, thereby improving partial locking of the gear train. That is, by increasing the resistance to fluid flow, the gear train has more resistance to counteract spinning of one wheel. Friction between the ends of the gear teeth and the chamber walls provides additional resistance to movement of the gears. The means for movably positioning the gears includes mounting the planet gears on loose fitting bearings. According to another aspect of the invention one or both of the planet gears of a pair not be mounted on bearings, so that they, so to speak, float within the gear chambers. The various forces applied to the planet gears cause the ends of the planet gear teeth to be pushed into close abutting relation with the chamber walls. Alternate pairs of planet gears are positioned between the internal ring gear and the sun gear in reversed orientation. Half of the planet gear pairs operate in one orientation and the other half operate in the other orientation. This provides improved partial locking and smoother, more uniform operation whether the drive train is being operated in a forward or a reverse direction.

DETAILED DESCRIPTION OF THE PREFERRED EMBODIMENT

This invention is an improvement to the partially locked drive train disclosed in U.S. Pat. No. 4,084,654 entitled "Partially Fluid Locked Vehicle Drive Train" granted to Harold M. Dudek on Apr. 18, 1978, and assigned to the assignee of the present invention. The disclosure of that patent is hereby incorporated by reference.

Figure 1:
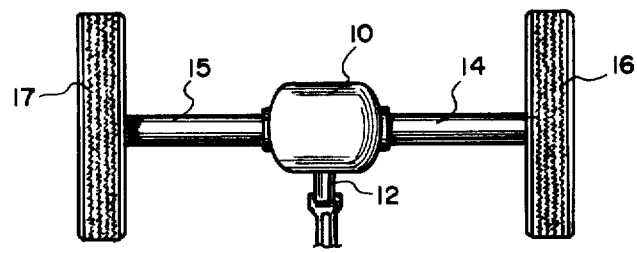
FIG. 1 is a schematic view of a typical automotive differential drive train.

The partially locked vehicle drive train improvement provided by this invention is particularly applicable to differential gear trains used in automotive applications such as axle and transfer case differentials. FIG. 1 of the drawings shows a typical axle differential application. The instant invention is advantageously used in front wheel drive systems and is also useful in conventional rear-wheel drive systems. Drive power is provided to an axle differential system 10 through a drive shaft 12 from a suitable source of drive power, such as from an automotive engine coupled through a suitable power transmission device. A first and a second axle 14, 15 are driven by the axle differential system 10. The axles 14, 15 drive the respective wheels 16, 17. When a vehicle is traveling in a straight line, the differential 10 permits both wheels 16, 17 to rotate at the same speed. When the vehicle turns differential 10 permits the axles to turn at different speeds.

Figure 2:
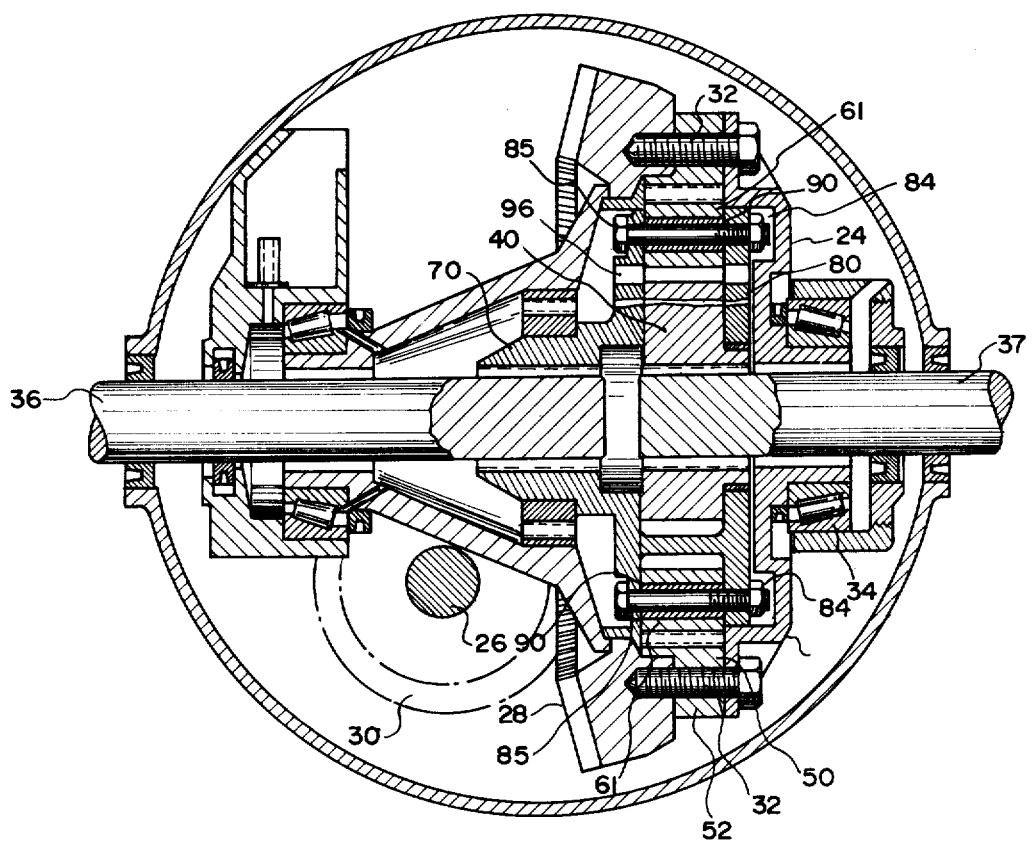
FIG. 2 is a sectional view of an automative differential drive incorporating a partially fluid locked drive system.

Referring now to FIG. 2, a partially fluid locked axle differential 20 is disclosed having a construction similar to that disclosed in the Dudek U.S. Pat. No. 4,084,654. It is obvious that the instant invention is also suitable for other applications such as vehicle transfer cases and the like. An outer housing 22 encloses an inner housing 24. The inner housing 24 receives drive power from a drive shaft 26 which is coupled to a hypoid gear 28 with conventional coupling gear means 30. The inner housing 24 is bolted to the hypoid gear 28 by means of bolts 32 (typically shown). The inner housing 24 is suitably mounted on bearing means 34. Axles 36, 37 are driven by the differential 20. A planetary differential gear system 40 is contained within the inner housing.

Figure 3:
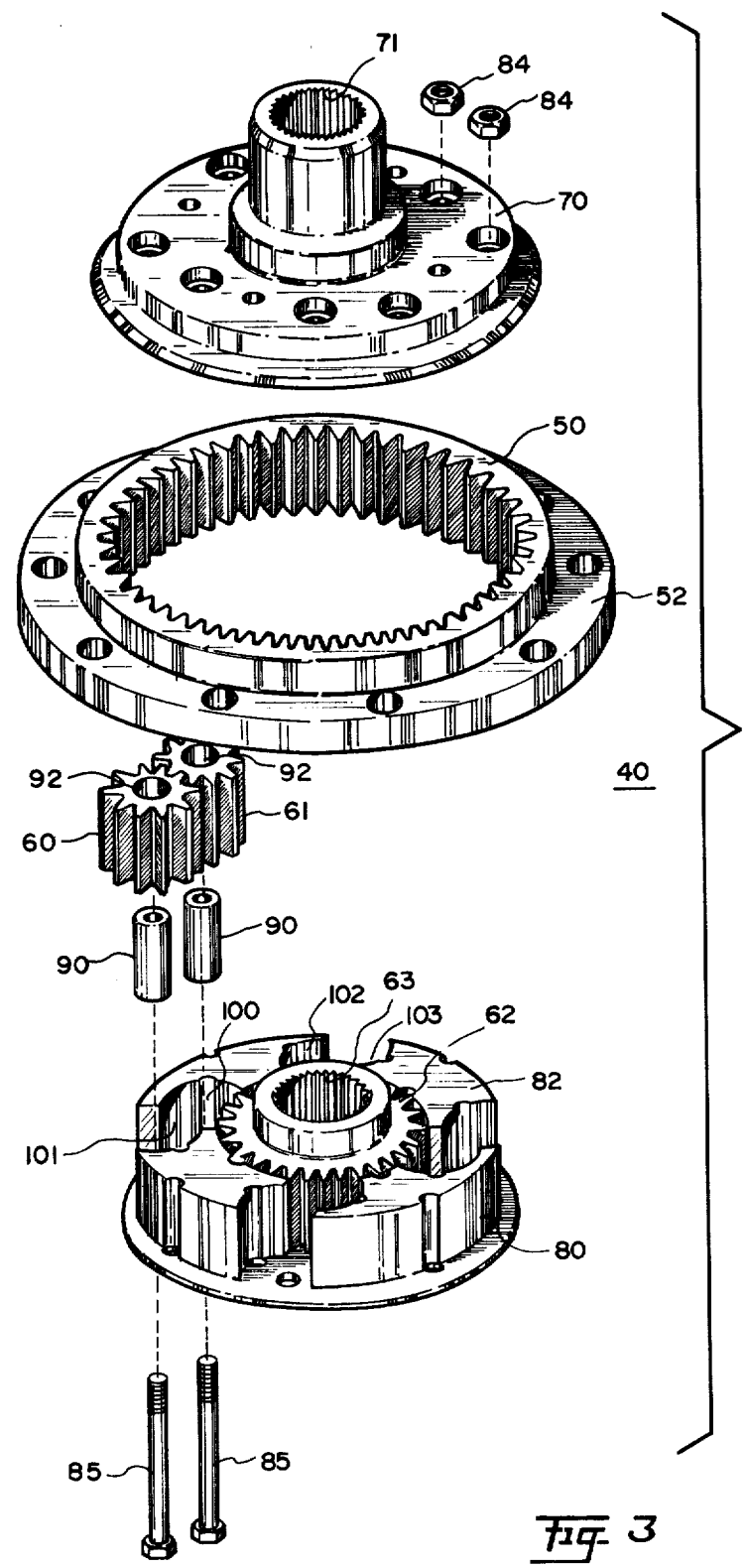
FIG. 3 is an exploded perspective view of a portion of an improved fluid locked drive train.

FIG. 3 shows the components of the planetary differential gear system 40. An internally-toothed ring gear 50 has an outwardly extending peripheral flange 52 which is sandwiched between the hypoid gear 28 and the inner housing 24. The ring gear 50 couples drive power from the drive axle 26 to the inner housing 24. A plurality of pairs of planetary gears 60, 61 (typically shown) respectively engage the ring gear 50 and a sun gear 62, which has internal splines 63 for engagement with the axle 37.

A lefthand cover plate 70 has internal splines 71 for engagement with the axle 36. A righthand cover plate 80 has an upwardly extending central portion 82, the top surface of which abuts the inside surface of the lefthand plate 70. The lefthand and the righthand plates 70, 80 are bolted together by the bolts 85 (typically shown) engaging the nuts 84 (typically shown). The cover plate 80 has chambers formed therein which surround the sun gear 62 and the plurality of planet gears 60, 61 as shown. The side plates are bolted together to form a planet gear carrier for the pairs of planet gears 60, 61. The planet gears 60, 61 rotate about bearing sleeves 90 (typically shown) which are formed, for example, from an aluminum, nickle and bronze bearing material. The outside diameter of the sleeve bearings 90 is smaller than the diameter of the axial bores 92 extending through the planet gears 60, 61. The gears 60, 61 thus have an axis of rotation which may drift due to the loose fit of the sleeve bearings 90. The righthand plate 80 is formed, for example, from a teflon-impregnated, cast iron material or a hard zinc coated material, while the gears are formed, for example, from case-hardened 4330 alloy steel. Possible galling of the plate 80 or the gears is prevented by using dissimilar materials.

Each of the side plates is provided with oil ports 96, some of which are coaxially aligned between the two plates 70, 80 to provide cooling for the gears. Other ports 96 are not aligned. Each of the ports 96 is aligned with the toothed periphery of one of the gears of the planetary differential. The purpose of the non-aligned ports is to allow oil or other suitable fluid to be introduced to one side plate into the gap between the teeth of the gears so that the gear teeth will carry the oil to the meshing point with its adjacent gear. At the meshing point the gears act as a gear pump and squeeze the oil so that it squirts out in all directions around the teeth of the meshing gears. As a result, the oil provides resistance to rotation of the gears using the hydraulic resistance. The plates 70, 80 fit closely against the ends of the gears and the chambers 100, 101, 102, 103 (typically shown) are formed therein to surround the ends of the gear teeth. The ports in the side plates are not located at the points of mesh between adjacent gears but are spaced away so that the pumping action does not occur right at the ports but rather spaced away from the ports in a relatively tightly sealed area, creating resistance to the motion of the gears. The planet gears 60, 61 may also be utilized without any sleeve bearings. This permits the planet gears to float within the chambers formed by the plates 70, 80, which is equivalent to having the planet gears loosely mounted on sleeve bearings.

When one of the axles 36, 37 rotates at a different speed than the other axle, the left hand cover plate 70 coupled to the axle 36 has a different angular velocity than the angular velocity of the sun gear coupled to the axle 37. The difference in angular velocity of the two gears causes the planet gears 60, 61 to rotate. The rotation of the gears is resisted by the fluid as described above. If the centers 60', 61' of the planet gears are not constrained to rotate about a fixed axis, the planet gears 60, 61 move in response to the reaction force tending to separate meshing gears and the torque reaction forces exerted on the differential gear train components. Planet gears are chosen which have a twenty-five degree pressure angle. In comparison to gears having a standard twenty degree pressure angle, gears having a greater pressure angle are not only stronger but provide greater separating forces between gears. The planet gears, being free to move within their respective chambers in response to the separating forces and torque reaction forces have the ends of the gear teeth or the peripheries of the gears pushed into close abutting relation with various portions of the chamber walls. It is believed that this abutting relationship further restricts the fluid flow within the chambers and increases the frictional forces between the gears and the chamber walls to thereby increase the resistance forces on the gear train.

Figure 4:
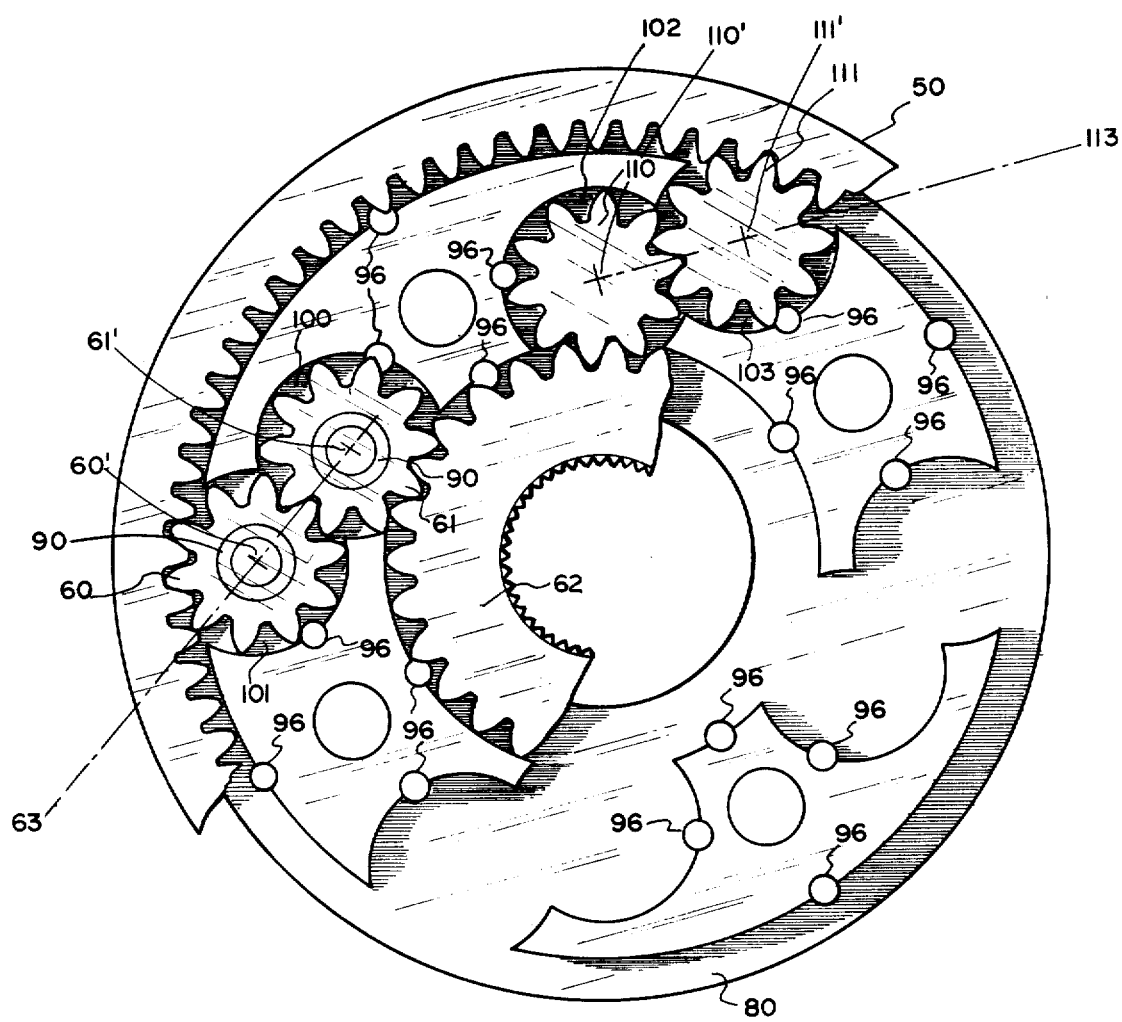
FIG. 4 is a plan view of a partial assembly of a planetary gear train according to the invention.

FIG. 4 shows a set of pairs of planet gears 60, 61 and 110, 111 alternately arranged. Adjacent chambers are symmetrically formed within the side plate 80 so that the walls of the adjacent chambers are symmetrically arranged as shown. The gears of each adjacent pair have the gears reversed in their relation orientation with respect to the sun gear and the internal ring gear. The righthand side plate 80 has the planet gear chambers arranged so that the planet gears are arranged in sets of pairs which are circumferentially spaced around the sun gear 62.

The axes of rotation of the gears in a set lie along common lines 63, 113, which shift slightly due to movement of the gear centers. Some of the common lines have one orientation and others have a different opposed orientation. This arrangement provides substantially the same total resisting force whether the gears are rotating in one or the other direction with respect to each other. In one direction of rotation, a pair of gears provides a particular amount of resistance force. In the opposite direction of rotation, the same pair of gears provides a different amount of resistance force. The alternative arrangemet of planet gear pairs provides for smooth engagement of the differential and tends to reduced sudden locking thereof. By symmetrically arranging the alternate gear pairs as shown in FIG. 4, the total resistance forces are similar whether the gears are working in one direction or the other.

FIG. 4 shows the planet gears 110, 111 with centers 110', 111' not supported by bearings, or floating within the chambers. As the gear centers move in response to the forces exerted upon them, the ends of the gear teeth are free to contact the walls of the chambers to provide enhanced resistance to gear movement and enhanced partial locking of the gears.

The embodiments of the invention described provide a means for enhancing the drag forces on differential gear trains providing improved partial fluid locking.

While particular embodiments of the present invention have been shown and described, it should be understood that the invention is not limited thereto, since many modifications may be made. It is therefore contemplated to cover by the present application any and all such modifications that fall within the true spirit and scope of the basic underlying principles disclosed and claimed herein.

I claim:

1. An improved fluid locked gear drive train for a transfer case of a differential or the like comprising:
   an outer fluid tight housing;
   an inner housing;
   a planetary gear train within said inner housing, said gear train including a sun gear, a plurality of planet gears and an internal ring gear;
   plate means positioned on opposite sides of said sun, planet and internal ring gears in close relation thereto and closely surrounding the peripheries of the gears;
   means freely mounting at least one of said planet gears for allowing the ends of the planet gear teeth to be moved into closer relation with the plate means surrounding said gears to increase hydrostatic drag on said gears;
   said plate means including fluid inlet and outlet ports aligned with teeth of said gears but with the inlet ports being spaced around the periphery of the gears a distance upstream in the direction of fluid movement from a point of mesh between two meshing gears for delivering fluid to a point of mesh between the gear and between said closely spaced planet gear and the plate means for increasing the hydrostatic fluid pressure on the teeth in such closer relation and thereby increasing fluid resistance drag on the planet gears for partial fluid lock; and
   means for delivering fluid into said inner housing and maintaining the inner housing in a generally filled condition and filling the space between the gear teeth and the plate means.

2. The gear drive train of claim 1, wherein said planet gears are in sets of pairs circumferentialy spaced around said sun gear, each planet gear having an axis of rotation with the axes of rotation of the planet gears of a set lying along a common line having a predetermined orientation, with such common lines of half of said planet gear sets having one orientation and the other half having a different opposed orientation whereby torque loads on the respective sets will increase drag equally regardless of direction of rotation of said planet gears for equalizing increased lock up forces in both direction.

3. The gear drive train of claim 1, wherein all of said gears lie in a common plane.

4. The gear train drive of claim 1, wherein the mounting means includes loose-fitting bearing means for said at least one planet gear.

5. The gear train of claim 1, wherein at least one of the planet gears floats.

* * * * *